(12) United States Patent
Holstine et al.

(10) Patent No.: US 11,305,880 B2
(45) Date of Patent: Apr. 19, 2022

(54) ARM RESTRAINT DEPLOYMENT SYSTEMS FOR EJECTION SEATS

(71) Applicant: AMI Industries, Inc., Colorado Springs, CO (US)

(72) Inventors: Steve Holstine, Colorado Springs, CO (US); Cyle Teal, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 232 days.

(21) Appl. No.: 16/707,625

(22) Filed: Dec. 9, 2019

(65) Prior Publication Data

US 2021/0171206 A1 Jun. 10, 2021

(51) Int. Cl.
*B64D 25/10* (2006.01)
*B64D 11/06* (2006.01)

(52) U.S. Cl.
CPC .......... *B64D 25/10* (2013.01); *B64D 11/062* (2014.12)

(58) Field of Classification Search
CPC .... B64D 25/10; B64D 11/062; B64D 11/0689
See application file for complete search history.

(56) References Cited

U.S. PATENT DOCUMENTS

| | | | |
|---|---|---|---|
| 3,214,118 A | 10/1965 | Martin | |
| 3,386,683 A | 6/1968 | Howland | |
| 3,633,852 A | 1/1972 | Forman et al. | |
| 3,960,051 A | 6/1976 | Hunt | |
| 3,972,261 A | 8/1976 | Weinstock et al. | |
| 4,028,948 A | 6/1977 | Frost et al. | |
| 4,081,156 A * | 3/1978 | Ideskar | B64D 25/02 244/122 AG |
| 4,215,835 A * | 8/1980 | Wedgwood | B64D 25/02 244/122 AG |
| 4,228,568 A | 10/1980 | Frost et al. | |
| 4,247,064 A * | 1/1981 | Schulman | B64D 25/02 244/122 AG |
| 4,488,691 A | 12/1984 | Lorch | |
| 4,508,294 A * | 4/1985 | Lorch | B64D 25/02 244/122 AG |
| 4,592,523 A * | 6/1986 | Herndon | B64D 25/02 244/122 AG |
| 4,667,902 A * | 5/1987 | Zenobi | B64D 25/02 244/122 A |
| 4,676,462 A | 6/1987 | Martin | |
| 4,856,433 A | 8/1989 | Evans | |
| 4,871,131 A | 10/1989 | Bernier et al. | |
| 5,056,739 A | 10/1991 | LeVay | |
| 5,072,897 A | 12/1991 | Aronne | |

(Continued)

FOREIGN PATENT DOCUMENTS

GB 709736 6/1954

*Primary Examiner* — Justin M Benedik
(74) *Attorney, Agent, or Firm* — Snell & Wilmer L.L.P.

(57) ABSTRACT

An arm restraint assembly for an ejection seat may comprise a primary arm and a primary arm deployment system operationally coupled to the primary arm. The primary arm deployment system may be configured to rotate the primary arm about a primary arm pivot joint. The primary arm deployment system may be configured to attach to the ejection seat such that the primary arm deployment system translates with the ejection seat.

16 Claims, 12 Drawing Sheets

(56) References Cited

U.S. PATENT DOCUMENTS

| | | | | |
|---|---|---|---|---|
| 5,301,903 | A * | 4/1994 | Aronne | B64D 25/02 |
| | | | | 244/122 AG |
| 5,415,366 | A * | 5/1995 | Mastrolia | B64D 25/02 |
| | | | | 244/122 AG |
| 5,746,395 | A | 5/1998 | Peck et al. | |
| 6,315,245 | B1 * | 11/2001 | Ruff | B64D 25/02 |
| | | | | 244/122 AG |
| 8,485,471 | B2 * | 7/2013 | Patterson | B64D 25/10 |
| | | | | 244/122 AG |
| 9,517,841 | B2 | 12/2016 | Ford | |
| 10,131,438 | B2 | 11/2018 | Benjamin et al. | |
| 2011/0114790 | A1 * | 5/2011 | Patterson | B64D 25/02 |
| | | | | 244/122 AG |
| 2021/0155348 | A1 * | 5/2021 | Holstine | B64D 25/10 |

* cited by examiner

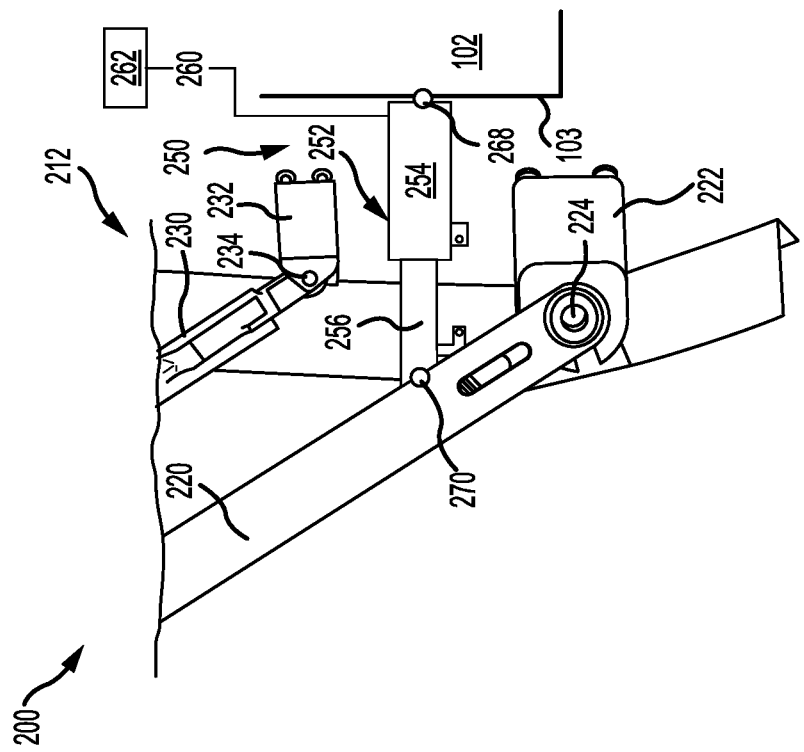
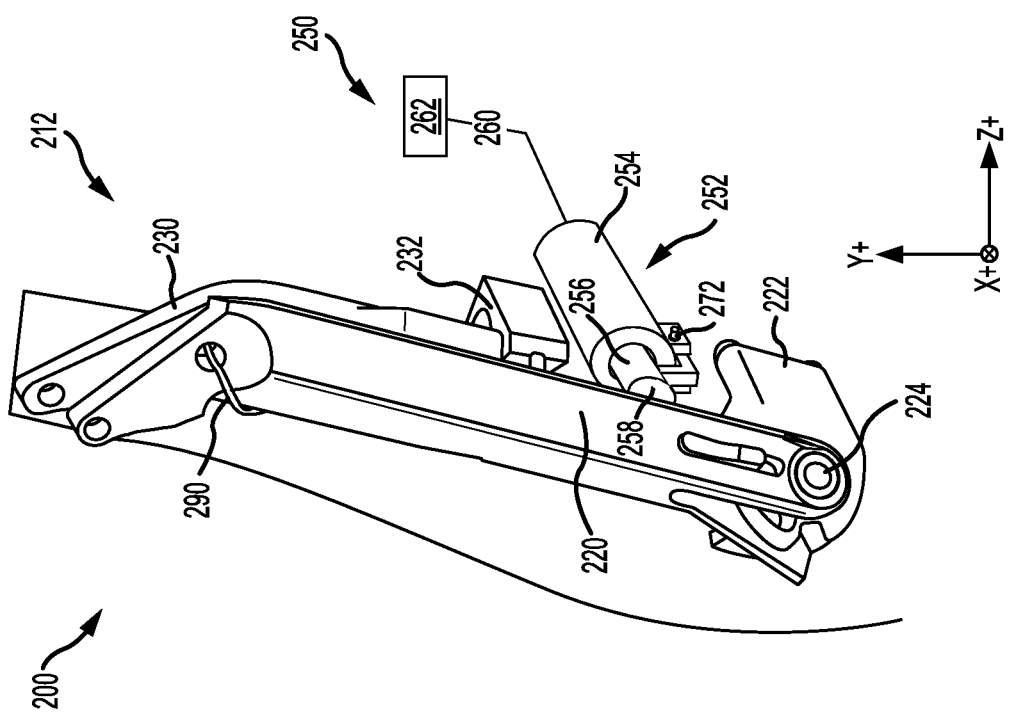

ARM RESTRAINT DEPLOYMENT SYSTEMS FOR EJECTION SEATS

FIELD

The present disclosure relates to ejection systems, and more specifically, to arm restraint deployment systems for ejection sets.

BACKGROUND

Ejection systems are designed to expel pilots from an aircraft cockpit. Upon ejection from the cockpit, the pilot enters the wind stream at the surface of the aircraft canopy. The pressure imposed on the pilot upon entering the wind stream (i.e., during windblast) acts to move the pilot's arms rearward. Current ejection seats may include limb restraint systems configured to reduce or prevent limb flail injuries during the ejection sequence. It is desirable to deploy the restraint system while the seat is located inside the cockpit. Current restraint systems tend to include a mechanical attachment (e.g., a lanyard) between a fixed location on the aircraft and the restraints. The mechanical attachment is configured to translate the restraints to a deployed position, in response to the ejection seat translating out of the aircraft. The mechanical attachment tends to take away energy from the rocket catapult used to propel the ejection seat, which may reduce overall clearance and performance.

SUMMARY

An arm restraint assembly for an ejection seat is disclosed herein. In accordance with various embodiments, the arm restraint assembly may comprise a primary arm and a primary arm deployment system. The primary arm deployment system may be attached to the ejection seat and operationally coupled to the primary arm. The primary arm deployment system may be configured to rotate the primary arm about a primary arm pivot joint.

In various embodiments, the primary arm deployment system may comprise a first biasing member configured to apply a first force to the primary arm. In various embodiments, the primary arm deployment system may further comprise a second biasing member configured to apply a second force to the primary arm. The first biasing member may comprise a compression spring and the second biasing member may comprise a torsion spring.

In various embodiments, the primary arm deployment system may comprise a cylinder configured to receive a fluid and a strut piston coupled to the primary arm and configured to translate relative to the cylinder. In various embodiments, the strut piston may be coupled to the primary arm via a pivot joint.

In various embodiments, the primary arm deployment system may further comprise a shear pin configured to block translation of the strut piston.

In various embodiments, the primary arm deployment system may comprise a reel assembly. The reel assembly may include a drum configured for rotation about an axis and a strap coupled to the primary arm and configured to be wound about the drum. In various embodiments, the reel assembly may further include at least one of a fluid input or an electromechanical motor.

An ejection seat is also disclosed herein. In accordance with various embodiments, the ejection seat may comprise a seat back and an arm restraint assembly coupled to the seat back. The arm restraint assembly may comprise a primary arm configured to pivot relative to the seat back, and a primary arm deployment system attached to the ejection seat and operationally coupled to the primary arm. The primary arm deployment system may be configured to rotate the primary arm about a primary arm pivot joint.

In various embodiments, the primary arm deployment system may comprise a first biasing member configured to force the primary arm away from the seat back. In various embodiments, the arm restraint assembly may further comprise a latch configured to rotate relative to the primary arm, and a fluid supply operatively coupled to the latch. The latch may be configured to rotate about a latch pivot joint in response to a fluid being output from the fluid supply.

In various embodiments, the primary arm deployment system may further comprise a second biasing member configured to rotate the primary arm about the primary arm pivot joint. The first biasing member may comprise a compression spring and the second biasing member may comprise a torsion spring.

In various embodiments, the primary arm deployment system may comprise a cylinder coupled to the seat back, and a strut piston coupled to the primary arm and configured to translate relative to the cylinder.

In various embodiments, the strut piston may be coupled to the primary arm via a first pivot joint, and the cylinder may be coupled to the seat back via a second pivot joint. In various embodiments, the primary arm deployment system may further comprise a shear pin configured to block translation of the strut piston.

In various embodiments, the primary arm deployment system may comprise a reel assembly including a drum configured for rotation about an axis and a strap coupled to the primary arm and configured to be wound about the drum.

In various embodiments, the reel assembly may further include at least one of a fluid input or an electromechanical motor.

An arm restraint assembly for an ejection seat, in accordance with various embodiments, may comprise a primary arm and a primary arm deployment system operationally coupled to the primary arm. The primary arm deployment system may be configured to rotate the primary arm about a primary arm pivot joint.

In various embodiments, the primary arm deployment system may comprise a pneumatic crank assembly configured to rotate the primary arm about the primary arm pivot joint.

In various embodiments, the primary arm deployment system may comprise an electromechanical actuator assembly configured to rotate the primary arm about the primary arm pivot joint.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

FIGS. 5A and 5B illustrate an arm restraint assembly including a pressure-activated primary arm deployment system, with the arm restraint assembly in a non-deployed position and a partially deployed position, respectively, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1A:
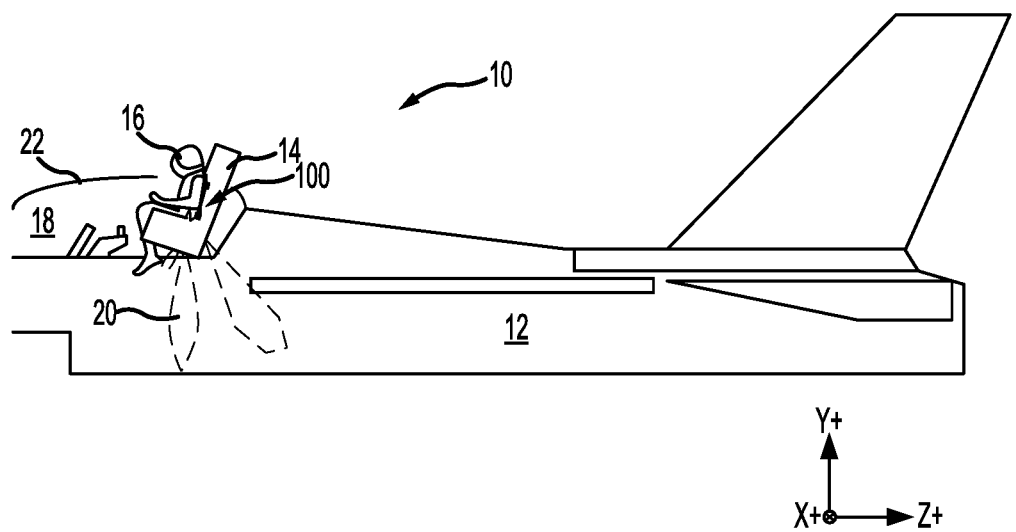
FIG. 1A illustrates an ejection seat being launched from an aircraft cockpit, in accordance with various embodiments.

With reference to FIG. 1A, an aircraft ejection system 10 is shown, in accordance with various embodiments. Aircraft ejection system 10 may be installed in aircraft 12 to expel an ejection seat 14 and an occupant 16 of ejection seat 14 from a cockpit 18 of aircraft 12. Ejection seat 14 may be urged from cockpit 18 by a propulsion system 20.

In accordance with various embodiments, ejection seat 14 includes an arm restraint assembly 100. Arm restraint assembly 100 may be configured to deploy while the arms of occupant 16 are located within cockpit 18. Stated differently, ejection system 10 may cause arm restraint assembly 100 to deploy prior to the arms of occupant 16 entering the wind stream outside of cockpit 18 (i.e., outside a canopy 22 of aircraft 12). Arm restraint assembly 100 is configured to limit rearward movement of the arms of occupant 16. Stated differently, in a deployed position, arm restraint assembly 100 may limit the arms of occupant 16 from moving aftward or toward the tail end of aircraft 12 (i.e., in the positive Z-direction on the provided XYZ axes).

Figure 1B:
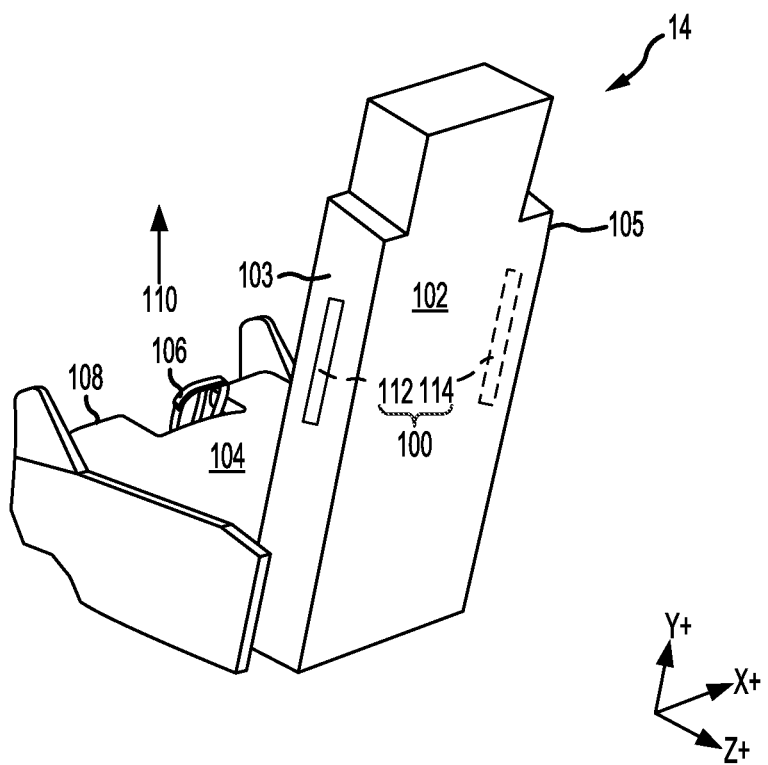
FIG. 1B illustrates a perspective view of an ejection seat including an arm restraint assembly, in accordance with various embodiments.

With reference to FIG. 1B, ejection seat 14 is illustrated with arm restraint assembly 100 in a non-deployed position, in accordance with various embodiments. Ejection seat 14 includes a seat back 102 and a seat pan 104. In various embodiments, an ejection handle 106 may be located proximate a frontside 108 of seat pan 104. Frontside 108 of seat pan 104 is generally opposite, or distal, seat back 102. While FIG. 1B shows ejection handle 106 located at frontside 108 of seat pan 104, it is further contemplated and understood that ejection handle 106 may be located anywhere that is accessible to an occupant of ejection seat 14. Ejection handle 106 may be configured to initiate an ejection sequence upon actuation. For example, occupant 16 (with momentary reference to FIG. 1A) pulling ejection handle 106 in the direction of arrow 110 may cause ejection seat 14 to be expelled from cockpit 18.

Ejection seat 14 includes arm restraint assembly 100. Arm restraint assembly 100 may include a left (or first) arm restraint 112 and a right (or second) arm restraint 114. Left and right arm restraints 112, 114 may be located at opposing sides of seat back 102. Left arm restraint 112 may be located proximate a first side panel 103 of seat back 102. Right arm restraint 114 may be located proximate a second side panel 105 of seat back 102. As described in further detail below, left and right arm restraints 112, 114 may include arms, or struts, configured to pivot relative to seat back 102. Upon initiation of the ejection sequence, the arms of left and right arm restraints 112, 114 pivot, or otherwise rotate, to a fully-deployed position.

Figure 2A:
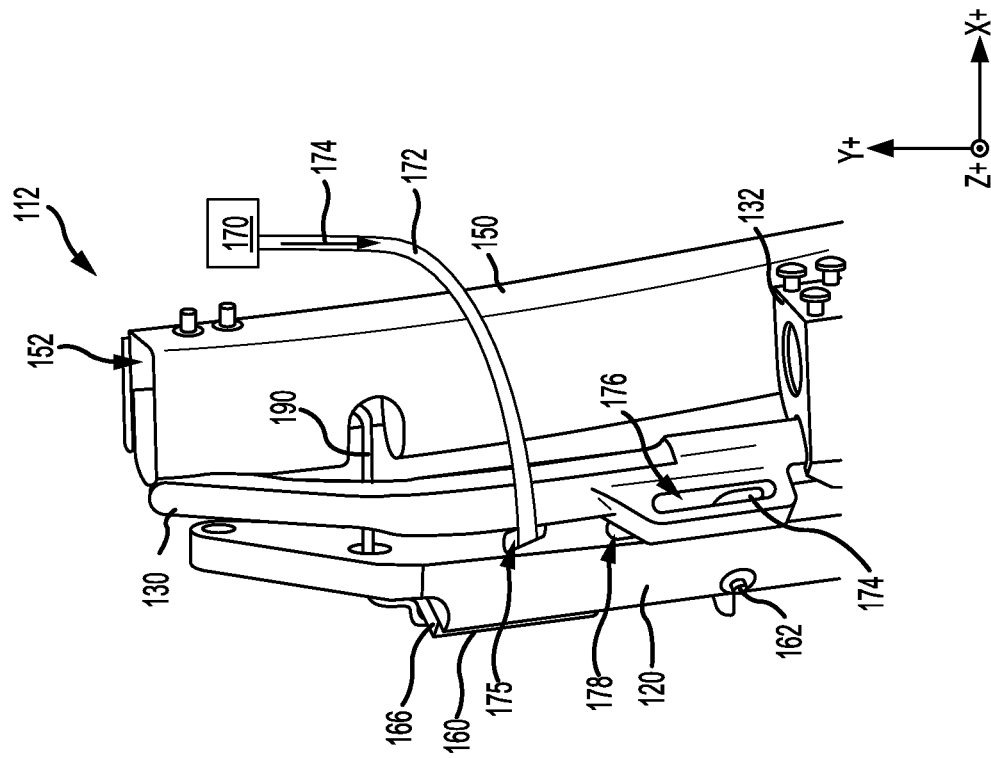
FIGS. 2A and 2B illustrate perspective views of an arm restraint assembly including a biased primary arm deployment system with the arm restraint assembly in a non-deployed position, in accordance with various embodiments.
Figure 2B:
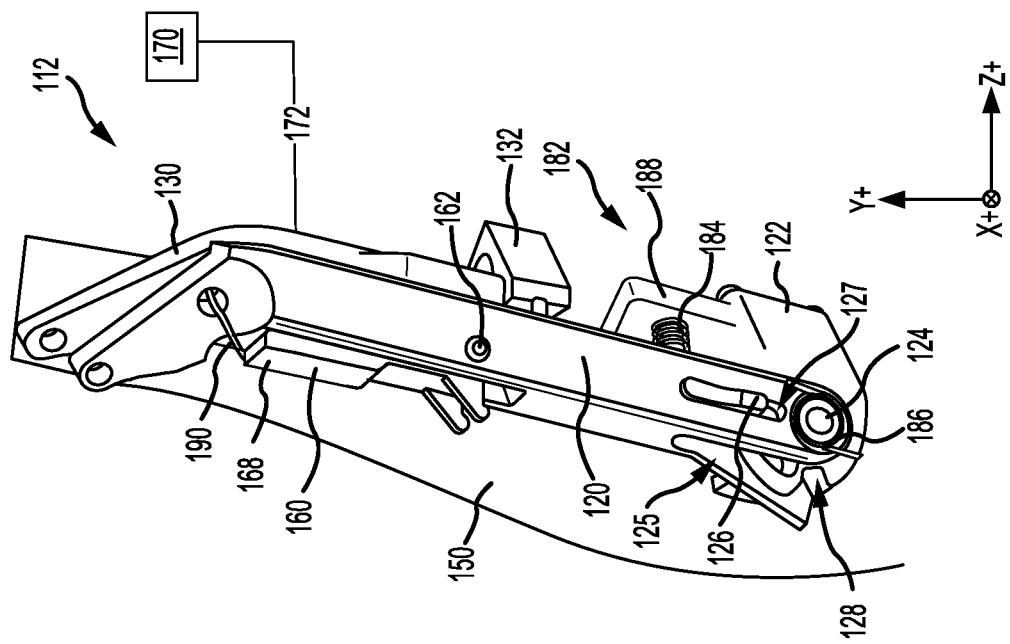

With reference to FIGS. 2A and 2B, and continuing reference to FIG. 1B, left arm restraint 112 is illustrated in a non-deployed position, in accordance with various embodiments. While elements and functionalities of left arm restraint 112 are described in relation to FIGS. 2A, 2B, 3A, 3B, 4A and 4B, it is further contemplated and understood that right arm restraint 114 is a mirror image of left arm restraint 112 and includes the elements and functionalities as described herein with respect to left arm restraint 112.

Left arm restraint 112 includes a primary (or first) arm 120. In various embodiments, left arm restraint 112 may include a secondary (or second) arm 130. In the non-deployed position, secondary arm 130 may be located between primary arm 120 and a net cover 150. Net cover 150 may form a portion of seat back 102 (FIG. 1B) and/or may be otherwise be attached to seat back 102. In response to deployment of ejection seat 14, primary arm 120 and secondary arm 130 pivot relative to side panel 103 (FIG. 1B) of seat back 102. Primary arm 120 is coupled, or otherwise attached, to seat back 102 (e.g., to first side panel 103) via a primary arm bracket 122. Primary arm bracket 122 is attached to seat back 102 via pins, rivets, screws, clips, or any other securement device. Secondary arm 130 is coupled or otherwise attached to seat back 102 (e.g., to first side panel 103) via a secondary arm bracket 132. Secondary arm bracket 132 is attached to seat back 102 via pins, rivets, screws, clips, or any other securement device. In various embodiments, primary arm bracket 122 and secondary arm bracket 132 are static structures, which do not pivot or otherwise rotate relative to seat back 102.

Figure 4A:
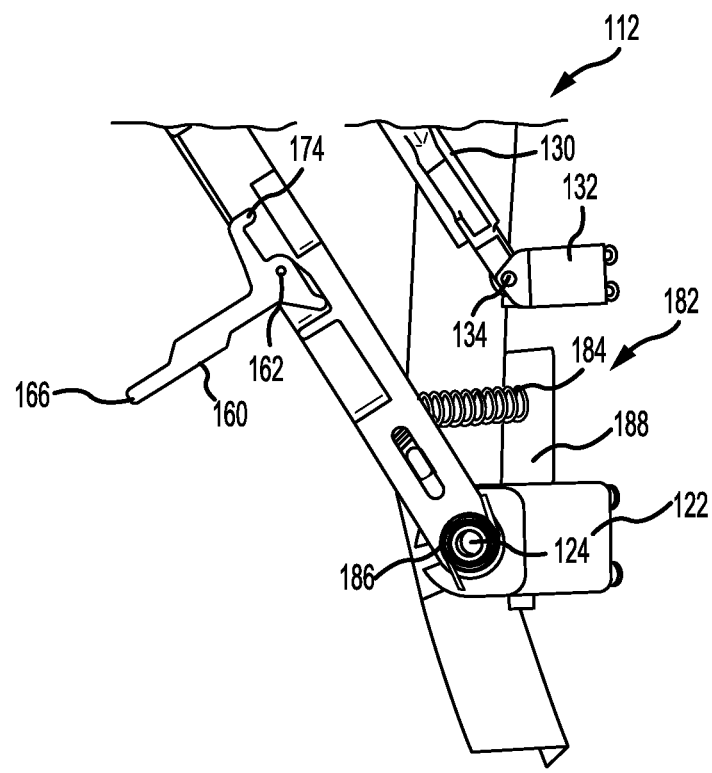
FIG. 4A illustrates the arm restraint assembly of FIGS. 2A and 2B in a partially-deployed position, in accordance with various embodiments.

Primary arm 120 may be rotationally coupled to primary arm bracket 122 via a primary arm pivot joint 124. During deployment of left arm restraint 112, primary arm 120 rotates relative to primary arm bracket 122 and about primary arm pivot joint 124. Secondary arm 130 may be rotationally coupled to secondary arm bracket 132 via a secondary arm pivot joint 134, with momentary reference to FIG. 4A. During the deployment of left arm restraint 112, secondary arm 130 rotates relative to secondary arm bracket 132 and about the secondary arm pivot joint 134 (FIG. 4A). In various embodiments, the axis of rotation about which primary arm 120 rotates is not parallel to the axis of rotation about which secondary arm 130 rotates.

In various embodiments, primary arm 120 may include a lock assembly 125. Lock assembly 125 may be configured to lock primary arm 120 in the fully-deployed position. Lock assembly 125 is configured to limit a rotation of primary arm 120. For example, lock assembly 125 may be configured such that in response to the primary arm 120 rotating a predetermined number of degrees (e.g., 90°), lock assembly 125 prevents, or otherwise blocks, further rotation of primary arm 120 and prevents, or otherwise blocks, primary arm 120 from rotating in the opposite direction (i.e., toward secondary arm 130 and side panel 103 of seat back 102). In various embodiments, lock assembly 125 may include a tab 126 coupled to primary arm 120. In various embodiments, tab 126 may be located in an orifice 127 defined by primary arm 120. Tab 126 is biased in a radially inward direction, toward primary arm pivot joint 124. Primary arm bracket 122 may define a groove 128. Groove 128 is configured to receive tab 126. Locating tab 126 in groove 128 generates an interference between tab 126 and primary arm bracket 122 that restricts or otherwise prevents rotation of primary arm 120 about primary arm pivot joint 124. In various embodiments, a location of groove 128 in primary arm bracket 122 may be selected such that tab 126 will translate into groove 128 when primary arm 120 has rotated a predetermined number of degrees (e.g., 75°, 90°, 100°, etc.).

Figure 3B:
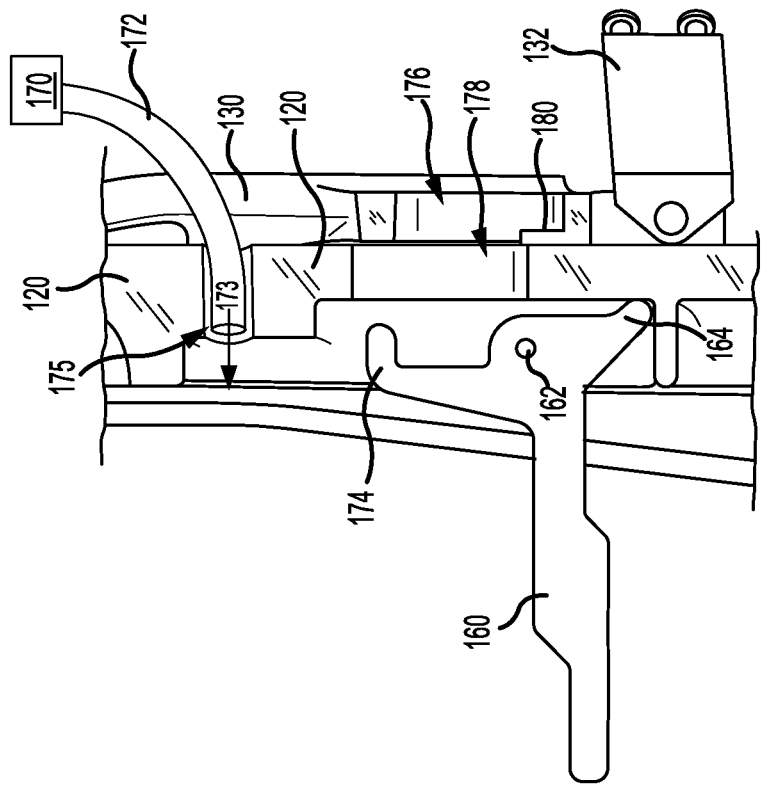
FIG. 3B illustrates a perspective view of a latch of an arm restraint assembly, with the latch in a deployed state, in accordance with various embodiments.
Figure 3A:
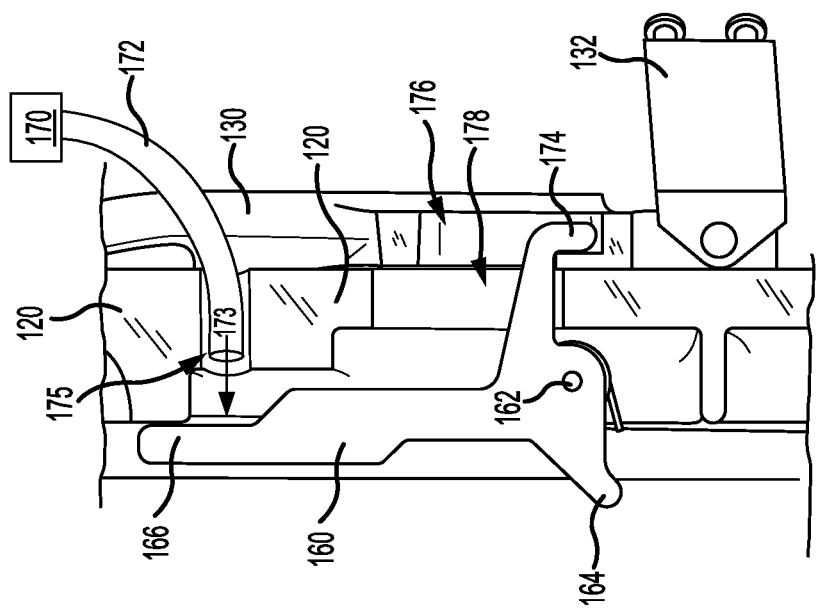
FIG. 3A illustrates a perspective view of a latch of an arm restraint assembly, with the latch in a non-deployed state, in accordance with various embodiments.

With reference to FIGS. 3A and 3B, in accordance with various embodiments, left arm restraint 112 includes a latch 160. Latch 160 is rotationally coupled to primary arm 120 via a latch pivot joint 162. Latch 160 may rotate relative to primary arm 120 and about latch pivot joint 162. In various embodiments, latch 160 may include a hook portion 174. In various embodiments, secondary arm 130 may define a secondary latch orifice 176 configured to receive hook portion 174. Primary arm 120 may define a primary latch orifice 178. In the non-deployed position, primary latch orifice 178 may be aligned with secondary latch orifice 176 and hook portion 174 of latch 160 may be located through primary latch orifice 178 and secondary latch orifice 176. When left arm restraint 112 is in the non-deployed position, hook portion 174 may engage, or contact, an interference surface 180 (FIG. 3B) of secondary arm 130. Hook portion 174 contacting interference surface 180 may secure primary arm 120 to secondary arm 130. The interference generated between hook portion 174 and interference surface 180 may block and/or prevent rotation of primary arm 120 and secondary arm 130 away from seat back 102.

In various embodiments, as latch 160 rotates about latch pivot joint 162, hook portion 174 rotates out secondary latch orifice 176 and primary latch orifice 178, thereby allowing primary arm 120 to separate from (i.e., rotate away from) secondary arm 130. In various embodiments, a fluid supply 170 (shown schematically) may be operatively coupled to latch 160 via a fluid supply line 172. In response to initiation of an ejection sequence (e.g., in response to actuation of ejection handle 106 in FIG. 1B), fluid supply 170 may begin outputting a fluid (e.g., gas) 174. The fluid 173 may be directed toward, and may generate a force against, latch 160. The force generated by fluid 173 is configured to cause latch 160 to rotate about latch pivot joint 162, thereby causing hook portion 174 of latch 160 to rotate out secondary latch orifice 176 and primary latch orifice 178. In various embodiments, primary arm 120 may define a fluid orifice 175 configured to receive fluid supply line 172 and direct fluid 173 toward latch 160. In various embodiments, fluid 173 may be directed toward a head end 166 of latch 160. Head end 166 is located generally opposite, or distal to, pivot joint 162. In various embodiments, fluid supply line 172 may supply fluid 173 to an actuator (e.g., a shock strut) coupled to latch 160. In response to receiving fluid 173, a piston of the actuator may translate toward latch 160, and thereby cause latch 160 to rotate about latch pivot joint 162. In this regard, latch 160 is configured to rotate about latch pivot joint 162 in response to fluid supply 170 outputting fluid 173.

With reference to FIG. 4A, in accordance with various embodiments, arm restraint assembly 100 includes a primary arm deployment system 182 configured to deploy left arm restraint 112. Primary arm deployment system 182 is a biased primary arm deployment system 182. Primary arm deployment system 182 may include a first biasing member 184 operatively coupled to primary arm 120. First biasing member 184 may be configured to apply a force against primary arm 120 and in a direction away from seat back 102. In this regard, first biasing member 184 may cause primary arm 120 to begin rotating about primary arm pivot joint 124. In various embodiments, first biasing member 184 may comprise a compression spring, a leaf spring, or any biasing component capable forcing primary arm 120 away from seat back 102. First biasing member 184 may be located between primary arm 120 and a flange 188 extending from primary arm bracket 122. In various embodiments, primary arm deployment system 182 may include a second biasing member 186 configured to apply a rotational force against primary arm 120. Second biasing member 186 may be configured to bias primary arm 120 in a circumferential direction about primary arm pivot joint 124. In various embodiments, second biasing member 186 may comprise a torsion spring. While FIG. 4A illustrates left arm restraint 112 including both first biasing member 184 and second biasing member 186, it is further contemplated and understood that, in various embodiments, left arm restraint 112 may include either first biasing member 184 or second biasing member 186. Primary arm deployment system 182 (e.g., first biasing member 184 and/or second biasing member 186) translates with the ejection seat during expulsion of the ejection seat from the cockpit.

Returning to FIG. 2B, in accordance with various embodiments, arm restraint assembly 100 may including a netting 190. Netting 190 may comprise rope, ribbon, webbing, string, etc. Netting 190 may be formed from polyaramid paraphenylene terephthalamide (PPTA), nylon, ballistic nylon, polypropylene, polyester, cotton, metal, metal alloy, or any other desired material. In the non-deployed position, as shown in FIGS. 2A and 2B, netting 190 may be located within a net cover 150, which may be located in or proximate first side panel 103 of seat back 102, with momentary reference to FIG. 1B. In various embodiments, net cover 150 may define a channel 152. Channel 152 may house portions of netting 190 prior to deployment of left arm restraint 112. Netting 190 may be attached to primary arm 120. As primary arm 120 rotates about primary arm pivot joint 124, netting 190 is drawn out of channel 152. In various embodiments, a portion of netting 190 may be coupled to secondary arm 130. As primary arm 120 rotates to the fully-deployed position, netting 190 may force secondary arm 130 to rotate away from net cover 150.

Figure 4B:
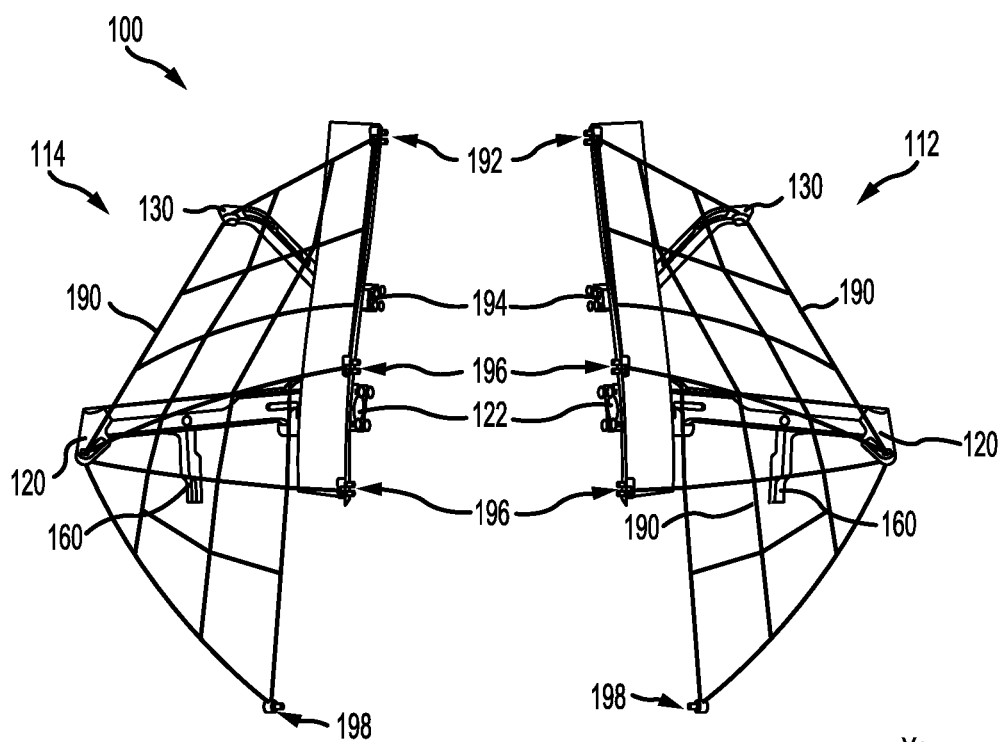
FIG. 4B illustrates the arm restraint assembly of FIGS. 2A and 2B in a fully-deployed position, in accordance with various embodiments.

Referring to FIG. 4B, left arm restraint 112 and right arm restraint 114 are shown in the fully-deployed position. In FIG. 4B, seat back 102 and seat pan 104 have been removed for clarity and to better illustrate the features of arm restraint assembly 100. Netting 190 may be coupled or otherwise attached to ejection seat 14 via a plurality of netting brackets, for example, via netting brackets 192, 194, 196, 198. In various embodiments, netting brackets 192, 194, 196 may be attached to seat back 102, with momentary reference to FIG. 1B, and netting bracket 198 may be attached to seat pan 104. Netting brackets 192, 194, 196, 198 may be attached via pins, rivets, screws, clips, or any other securement device.

In the fully-deployed position, netting 190 is drawn taut between primary arm 120 and netting brackets 192, 194, 196, 198. Netting 190 may restrict rearward arm or other limb movement for an occupant of ejection seat 14 in FIG. 1B.

Figure 5C:
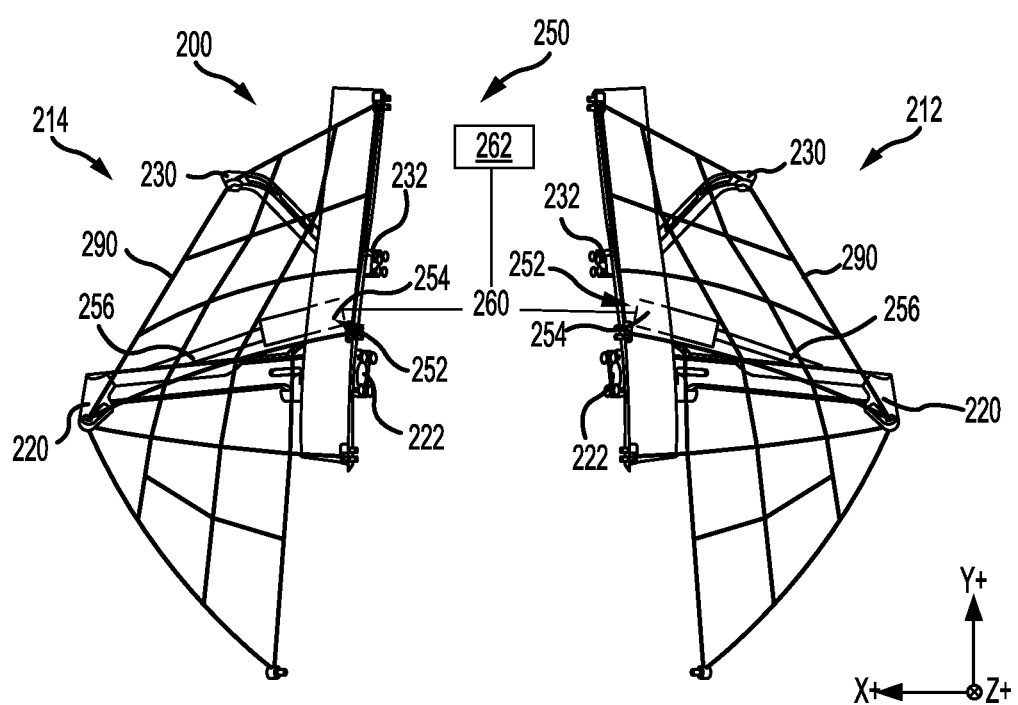
FIG. 5C illustrates an arm restraint assembly including a pressure-activated primary arm deployment system, with the arm restraint assembly in a fully-deployed position, in accordance with various embodiments.

Referring now to FIGS. 5A, 5B, and 5C, an arm restraint assembly 200 is illustrated in a non-deployed position, a partially deployed position, and a fully-deployed position, respectively. In various embodiments, ejection seat 14, with momentary reference to FIG. 1B, may include arm restraint assembly 200 in place of arm restraint assembly 100. Arm restraint assembly 200 includes a left arm restraint 212 and a right arm restraint 214 (FIG. 5C). While elements and functionalities of left arm restraint 212 are described in relation to FIGS. 5A and 5B, it is further contemplated and understood that right arm restraint 214 is a mirror image of left arm restraint 212 and includes the elements and functionalities as described herein with respect to left arm restraint 212.

Left arm restraint 212 includes a primary (or first) arm 220. In various embodiments, left arm restraint 212 may include a secondary (or second) arm 230. Primary arm 220 may be coupled to seat back 102 in FIG. 1B via a primary arm bracket 222. Secondary arm 230 may be coupled to seat back 102 to seat back 102 in FIG. 1B via a secondary arm bracket 232. Primary arm 220 may be rotationally coupled to primary arm bracket 222 via a primary arm pivot joint 224. Secondary arm 230 may be rotationally coupled to secondary arm bracket 232 via a secondary arm pivot joint 234 (FIG. 5B). In various embodiments, the axis of rotation about which primary arm 220 rotates is not parallel to the axis of rotation about which secondary arm 230 rotates.

In accordance with various embodiments, arm restraint assembly 200 includes a primary arm deployment system 250. In accordance with various embodiments, primary arm deployment system 250 is a pressure-activated deployment system. Primary arm deployment system 250 may include an actuator 252. Actuator 252 includes a cylinder 254 and a strut piston 256 configured to translate, or slide, relative cylinder 254. An end 258 of strut piston 256 may be attached to primary arm 220. A fluid supply line 260 may be fluidly coupled between a fluid supply 262 and cylinder 254. In response to initiation of an evacuation event, for example, in response to actuation of ejection handle 106 in FIG. 1B, fluid supply 262 may output fluid (hydraulic fluid, oil, gas, liquid, or any combinations thereof) to cylinder 254.

Cylinder 254 may be attached to seat back 102 (FIG. 5B) via a pivot joint 268. In various embodiments, cylinder 254 may be coupled to first side panel 103, with momentary reference to FIG. 1B, of seat back 102. End 258 of strut piston 256 may be attached to primary arm 220 via a pivot joint 270. Pivot joint 270 may comprise a ball-in-socket joint or other joint configured to allow multidirectional movement and rotation of primary arm 220 relative to strut piston 256. Actuator 252 may maintain left arm restraint 112 in the non-deployed or stowed position prior to initiation of the evacuation event. In this regard, actuator 252 may prevent or reduce rotation of primary arm 220 away from secondary arm 230 and seat back 102, thereby preventing or reducing occurrences of unintended deployment. In various embodiments, actuator 252 may include a shear pin 272. Shear pin 272 may block or restrict translation of strut piston 256. Shear pin 272 is configured to shear or break in response to the pressure within cylinder 254 exceeding a threshold pressure. In response to the shearing of shear pin 272, strut piston 256 translates out cylinder 254 and forces primary arm 220 toward the deployed position.

Actuator 252 restricting rotation of primary arm 220, prior to deployment of arm restraint assembly 200, may allow latch 160 (with momentary reference to FIG. 3A) to be eliminated from the primary arm. In various embodiments, primary arm 220 may include a lock assembly, similar to lock assembly 125 in FIG. 2A. With reference to FIG. 5C, arm restraint assembly 200 includes a netting 290, similar to netting 190 of arm restraint assembly 100 in FIG. 4B. In the fully-deployed position, netting 290 is drawn taut by primary arm 220. Netting 290 may restrict rearward arm or other limb movement for an occupant of the ejection seat. Primary arm deployment system 250 may be coupled to ejection seat 14 (e.g., seat back 102), with momentary reference to FIG. 1B. In this regard, primary arm deployment system 250 (e.g., actuator 252 and/or fluid supply 262)

translates with the ejection seat during expulsion of the ejection seat from the cockpit.

Figure 6B:
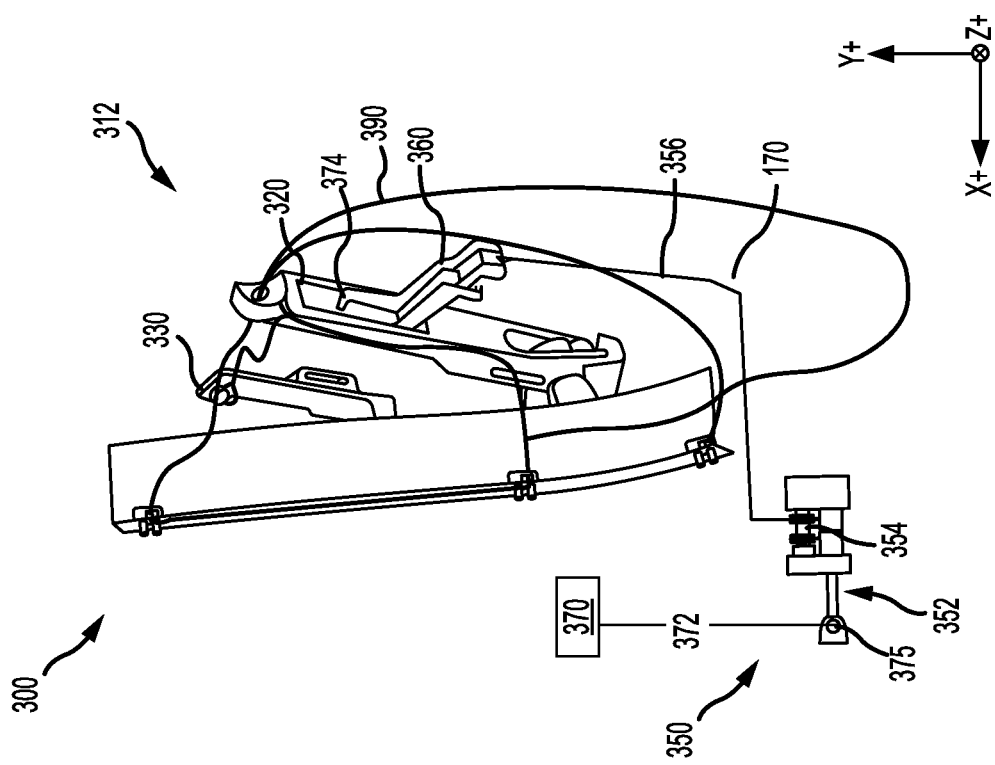
FIGS. 6A and 6B illustrate an arm restraint assembly including an inertial real primary arm deployment system, with the arm restraint assembly in a non-deployed position and a partially deployed position, respectively, in accordance with various embodiments.
Figure 6A:
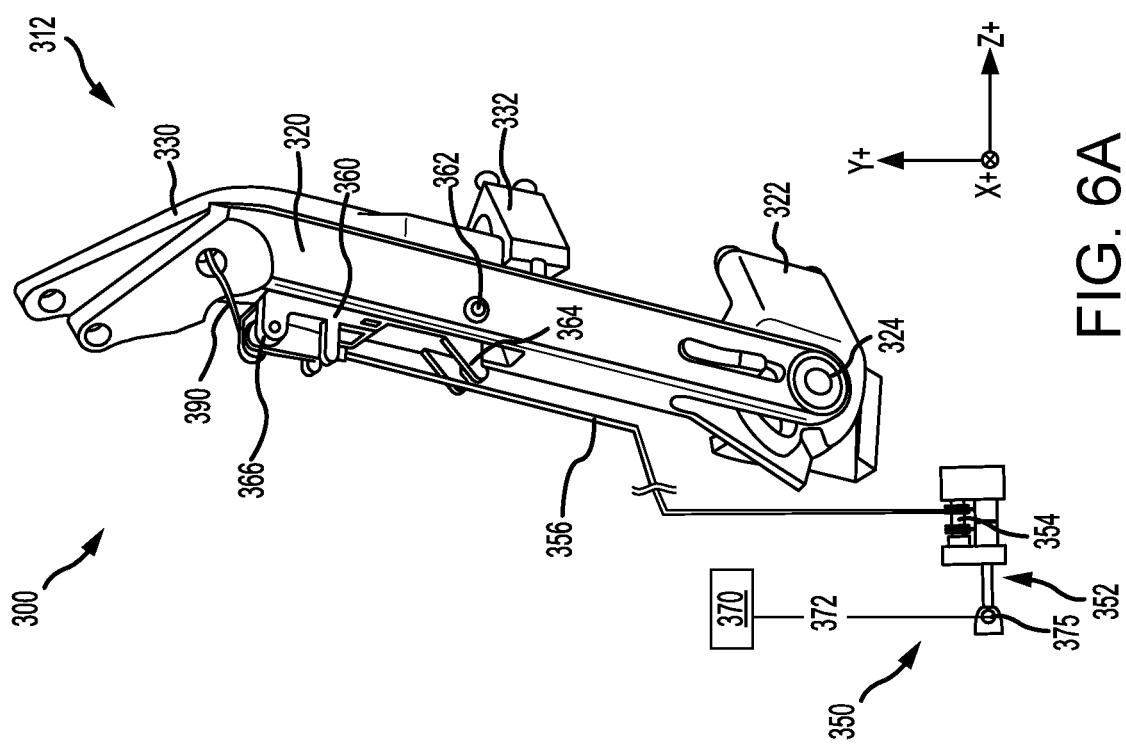
Figure 6C:
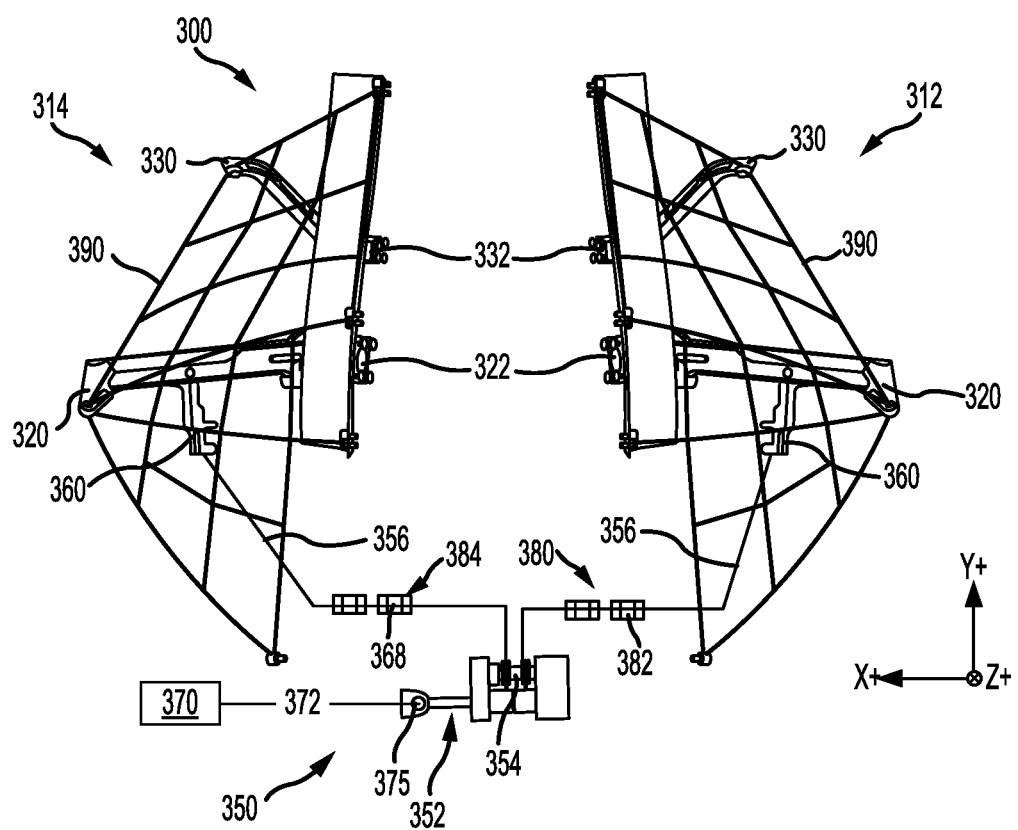
FIG. 6C illustrates an arm restraint assembly including an inertial real primary arm deployment system, with the arm restraint assembly in a fully-deployed position, in accordance with various embodiments.

Referring now to FIGS. 6A, 6B, and 6C, an arm restraint assembly 300 is illustrated in a non-deployed position, a partially deployed position, and a fully-deployed position, respectively. In various embodiments, ejection seat 14, with momentary reference to FIG. 1B, may include arm restraint assembly 300 in place of arm restraint assembly 100. Arm restraint assembly 300 includes a left arm restraint 312 and a right arm restraint 314 (FIG. 5C). While elements and functionalities of left arm restraint 312 are described in relation to FIGS. 6A and 6B, it is further contemplated and understood that right arm restraint 314 is a mirror image of left arm restraint 312 and includes the elements and functionalities as described herein with respect to left arm restraint 312.

Left arm restraint 312 includes a primary (or first) arm 320. In various embodiments, left arm restraint 312 may include a secondary (or second) arm 330. Primary arm 320 may be coupled to seat back 102 (FIG. 1B) via a primary arm bracket 322. Secondary arm 330 may be coupled to seat back 102 (FIG. 1B) via a secondary arm bracket 332. Primary arm 320 may be rotationally coupled to primary arm bracket 322 via a primary arm pivot joint 324. Secondary arm 330 may be rotationally coupled to secondary arm bracket 332 via a secondary arm pivot joint. In various embodiments, the axis of rotation about which primary arm 320 rotates is not parallel to the axis of rotation about which secondary arm 330 rotates.

In accordance with various embodiments, arm restraint assembly 300 includes a primary arm deployment system 350. Primary arm deployment system 350 is an inertial reel deployment system. Primary arm deployment system 350 may include a reel assembly 352. With combined reference to FIG. 1B and FIG. 6A, reel assembly 352 may be located coupled to ejection seat 14. In various embodiments, reel assembly 352 may be located within seat pan 104, seat back 102, or any desired location in ejection seat 14. Coupling reel assembly 352 to ejection seat 14 allows reel assembly 352 to translate with ejection seat 14.

With renewed reference to FIGS. 6A and 6B in accordance with various embodiments, reel assembly 352 includes a drum 354 around which a strap, or cord, 356 attached to primary arm 320 may be wound. In various embodiments, drum 354 may be pneumatically driven. In various embodiments, arm restraint assembly 300 includes a fluid supply 370. Fluid supply 370 may be a cylinder comprising a compressed gas, a solid gas generating material, or any other suitable fluid supply. Fluid supply 370 may be fluidly coupled to reel assembly 352 via a fluid supply line 372. Fluid supply line 372 may be fluidly coupled to a fluid input port 375 of reel assembly 352. Fluid supply 370 may supply fluid (e.g., gas) to reel assembly 352 in response to initiation of the ejection sequence. In various embodiments, actuation of ejection handle 106 in FIG. 1B may cause fluid supply 370 to begin outputting fluid to reel assembly 352. For example, actuation of ejection handle 106 may cause a valve of fluid supply 370 to translate to an open position. In accordance with various embodiments, drum 354 is configured to rotate in response to reel assembly 352 receiving fluid from fluid supply 370. Stated differently, the fluid from fluid supply 370 may provide rotational power to drive a rotation of drum 354.

Strap 356 may be attached to a latch 360. Latch 360 is rotationally coupled to primary arm 320 via a latch pivot joint 362. Latch 360 may rotate, relative to primary arm 320, via latch pivot joint 362 (FIG. 6A). Strap 356 may be attached to a head end 366 (FIG. 6A) of latch 360 and to reel assembly 352. As strap 356 winds about drum 354, latch 360 rotates about latch pivot joint 362. Latch 360 may include one or more leg(s) 364 (FIG. 6A). In the non-deployed position, legs 364 may extend away from primary arm 320. As primary arm 320 rotates about latch pivot joint 362, head end 366 of latch 360 may rotate away from primary arm 320 and legs 364 may rotate toward primary arm 320. Head end 366 of latch 360 may be located opposite, or distal, latch pivot joint 362 and legs 364.

In various embodiments, latch 360 may include a hook portion 374 (FIG. 6B), similar to hook portion 174 of latch 160 in FIG. 3A. Hook portion 374 may be located approximately 90°, about latch pivot joint 362, from head end 366 of latch 360. Hook portion 374 may be located approximately 180°, about latch pivot joint 362, from legs 364. In the non-deployed position, hook portion 374 may engage, or contact, a surface of secondary arm 330 to secure primary arm 320 to secondary arm 330.

In various embodiments, as latch 360 rotates about latch pivot joint 362, hook portion 374 rotates out a secondary latch orifice defined by secondary arm 330 and a primary latch orifice defined by primary arm 320, thereby allowing primary arm 320 to separate from (i.e., rotate away from) secondary arm 330. Latch 360 may rotate about latch pivot joint 362 until legs 364 contact a surface of primary arm 320. Legs 364 contacting primary arm 320 creates an interference that tends to prevent further rotation of latch 360. The load from strap 356 (i.e., the load generated by rotation of drum 354) along with the interference generated between legs 364 and primary arm 320 causes primary arm 320 to rotate about primary arm pivot joint 324.

With reference to FIG. 6C, left arm restraint 312 and right arm restraint 314 are shown in the fully deployed position. Arm restraint assembly 300 includes a netting 390, similar to netting 190 of arm restraint assembly 100 in FIG. 4B. In the fully-deployed position, netting 390 is drawn taut by primary arm 320. Netting 390 may restrict rearward arm or other limb movement for an occupant of the ejection seat.

In various embodiments, drum 354 may be configured to rotate (e.g., the volume of fluid supplied by fluid supply 370 may be selected to force drum to rotate) until left arm restraint 312 and right arm restraint 314 are in the fully deployed position. In various embodiments, left arm restraint 312 and right arm restraint 314 may each include a lock assembly similar to lock assembly 125 in FIG. 2A.

In various embodiments, reel assembly 352 may be configured to allow drum 354 to rotate in a first circumferential direction configured to wind strap 356 about drum 354, and to restrict rotation of drum 354 in a second circumferential direction opposite the first circumferential direction. For example, reel assembly 352 may include a ratchet and pawl or a sprag clutch configured to block or interfere with rotation of drum 354 in the second circumferential direction.

In various embodiments, one or more first pullies 380 may be located between reel assembly 352 and primary arm 320 of left arm restraint 312. Strap 356 of left arm restraint 312 may be located through first pullies 380. First pullies 380 may each include a wheel 382 configured to rotate about an axis. First pullies 380 may be configured to allow wheels 382 to rotation in a first direction and to restrict rotation of wheels 382 in a second direction opposite the first direction. For example, each first pulley 380 may include a ratchet and pawl or sprag clutch configured to block or interfere with rotation of wheel 382 in the second direction. In various embodiments, one or more second pullies 384 may be located between reel assembly 352 and primary arm 320 of right arm restraint 314. Strap 356 of right arm restraint 314 may be located through second pullies 384. Second pullies 384 may each include a wheel 386 configured to rotate about an axis. Second pullies 384 may be configured to allow wheels 386 to rotation in a first direction and to restrict rotation of wheels 382 in a second direction opposite the first direction. For example, each second pulley 384 may include a ratchet and pawl or a sprag clutch configured to block or interfere with rotation of wheel 386 in the second direction. Primary arm deployment system 350 may be coupled to ejection seat 14, with momentary reference to FIG. 1B. In this regard, primary arm deployment system 350 (e.g., reel assembly 352 and/or fluid supply 370) translates with the ejection seat during expulsion of the ejection seat from the cockpit.

Figure 7:
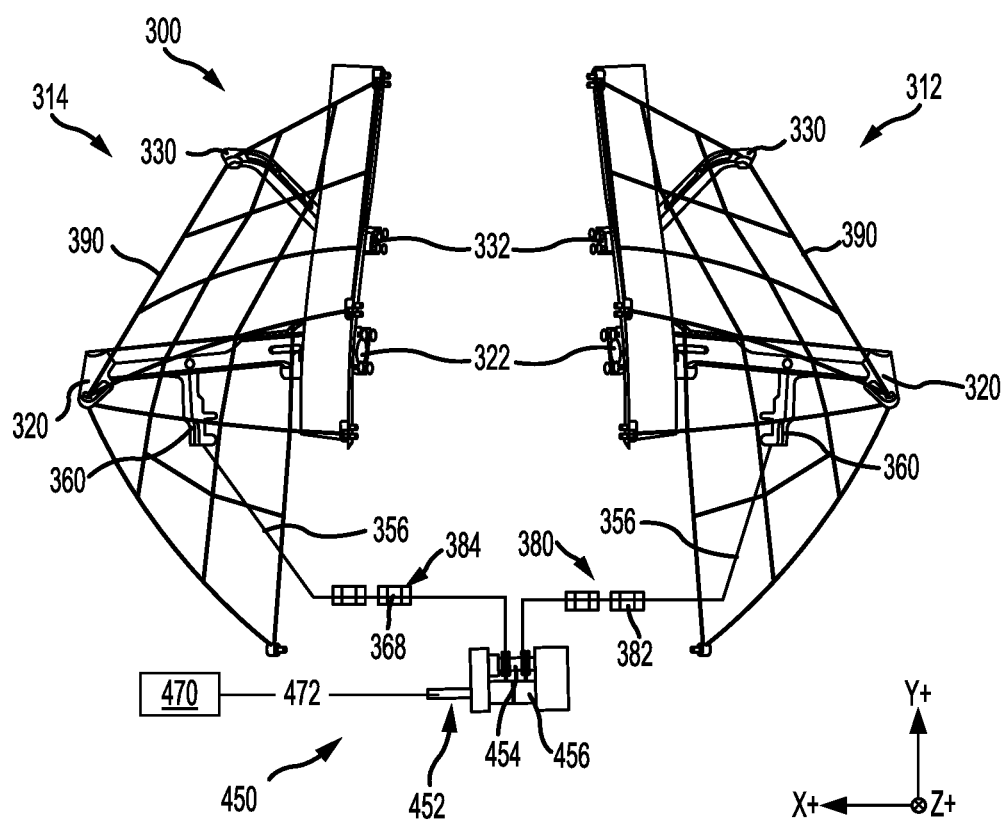
FIG. 7 illustrates an arm restraint assembly including an electromechanical real primary arm deployment system, with the arm restraint assembly in a fully-deployed position, in accordance with various embodiments.

With reference to FIG. 7, arm restraint assembly 300 is illustrated including a primary arm deployment system 450. Primary arm deployment system 450 is an electromechanical reel deployment system. Arm restraint assembly 300 may include primary arm deployment system 450 in place of primary arm deployment system 350 in FIG. 6C.

Primary arm deployment system 450 includes a reel assembly 452. Reel assembly 452 includes an electromechanical motor 456 and a drum 454. Electromechanical motor is configured to drive rotation of drum 454. In various embodiments, primary arm deployment system 450 may include an electrical supply 470 electrically coupled to electromechanical motor 456. An electrical signal may be provided to electromechanical motor 456 in response activation of electrical supply 470. In various embodiments, electrical supply 470 may include one or more thermal batteries. The electrical signal may be provided to electromechanical motor 456 via wire(s) 472. Electromechanical motor 456 may rotate drum 454 in response to receiving the electrical signal (i.e., in response to activation of electrical supply 470). In various embodiments, actuation of ejection handle 106, with momentary reference to FIG. 1B, may activate electrical supply 470. In this regard, actuation of ejection handle 106 may cause reel assembly 452 to retract straps 356, thereby translating the left arm restraint 312 and right arm restraint 314 to the fully-deployed position. Primary arm deployment system 450 may be coupled to ejection seat 14, with momentary reference to FIG. 1B. In this regard, primary arm deployment system 450 (e.g., reel assembly 452 and/or electrical supply 470) translates with the ejection seat during expulsion of the ejection seat from the cockpit.

Figure 8B:
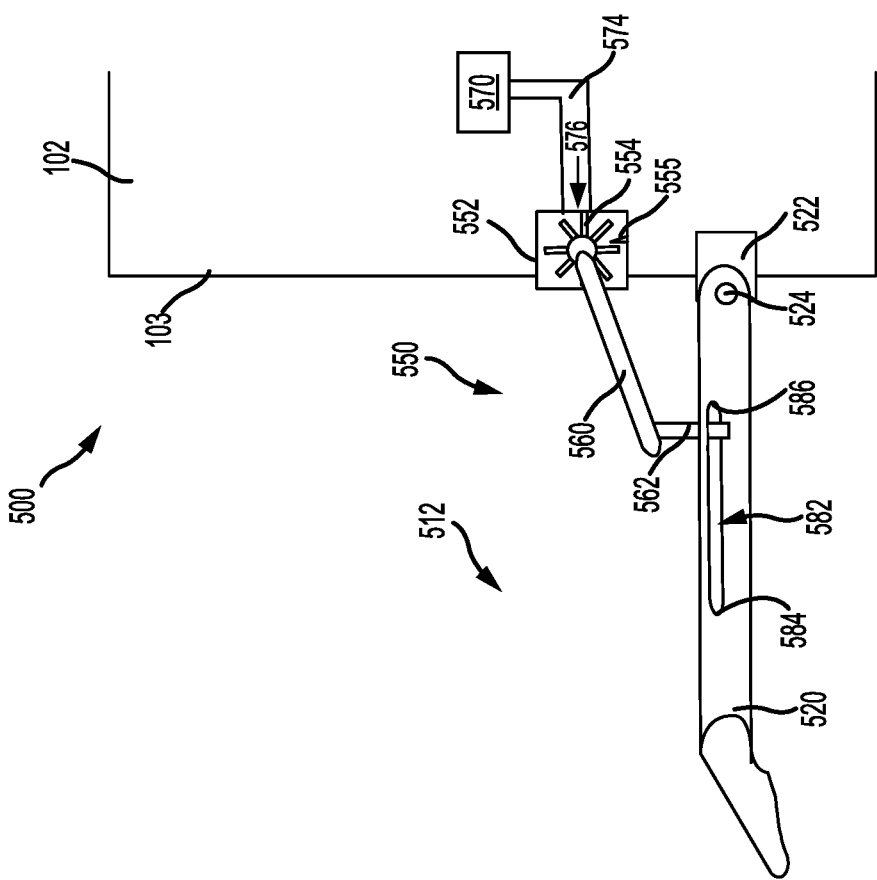
FIGS. 8A and 8B illustrate an arm restraint assembly including a pneumatic crank primary arm deployment system, with the arm restraint assembly in a non-deployed position and a fully-deployed position, respectively, in accordance with various embodiments.
Figure 8A:
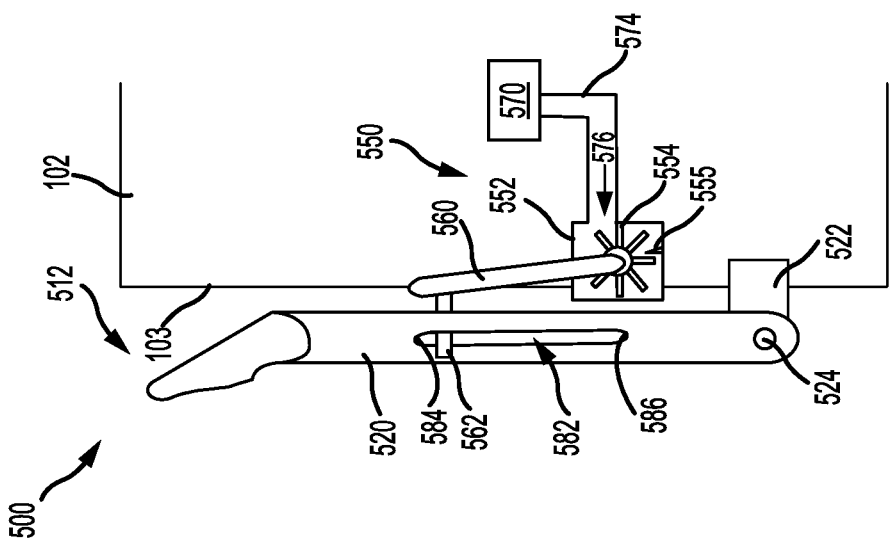
Figure 8C:
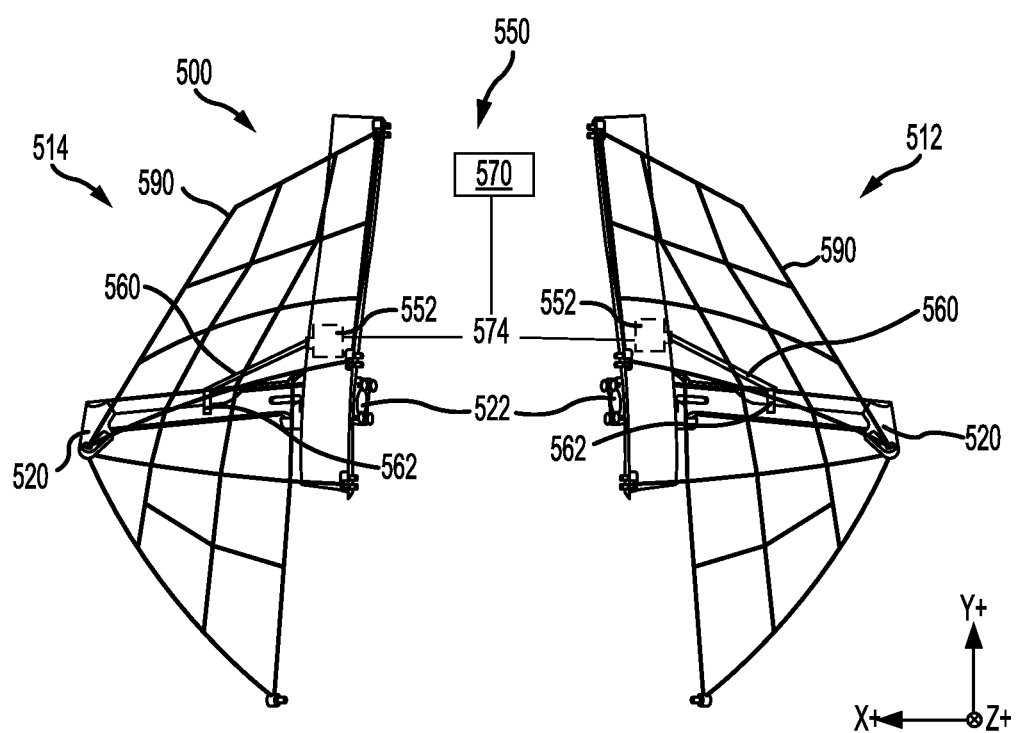
FIG. 8C illustrates an arm restraint assembly including a pneumatic crank primary arm deployment system, with the arm restraint assembly in a fully-deployed position, in accordance with various embodiments.

With references to FIGS. 8A, 8B, and 8C, an arm restraint assembly 500 is illustrated. In FIG. 8A, arm restraint assembly 500 is illustrated in a non-deployed position. In FIGS. 8B and 8C arm restraint assembly 500 is illustrated in a fully-deployed position. In various embodiments, ejection seat 14, with momentary reference to FIG. 1B, may include arm restraint assembly 500 in place of arm restraint assembly 100. Arm restraint assembly 500 includes a left arm restraint 512 and a right arm restraint 514 (FIG. 8C). While elements and functionalities of left arm restraint 512 are described in relation to FIGS. 8A and 8B, it is further contemplated and understood that right arm restraint 514 is a mirror image of left arm restraint 512 and includes the elements and functionalities as described herein with respect to left arm restraint 512.

Referring to FIGS. 8A and 8B, left arm restraint 512 includes a primary (or first) arm 520. In various embodiments, a secondary (or second) arm may be eliminated from left arm restraint 512. In various embodiments, left arm restraint 512 may include a secondary arm similar to secondary arm 130 in FIG. 2B. Primary arm 520 is coupled to seat back 102 via a primary arm bracket 522. Primary arm 520 may be rotationally coupled to primary arm bracket 522 via a primary arm pivot joint 524.

In accordance with various embodiments, arm restraint assembly 500 includes a primary arm deployment system 550. In accordance with various embodiments, primary arm deployment system 550 is a pneumatic crank primary arm deployment system. Primary arm deployment system 550 may include a crank assembly 552. Crank assembly 552 may be coupled to seat back 102. In this regard, crank assembly 552 translates with seat back 102 during deployment of ejection seat 14.

Crank assembly 552 may include a crank wheel 554. Crank wheel 554 may be pneumatically driven. In various embodiments, primary arm deployment system 550 includes a fluid supply 570. Fluid supply 570 may be a cylinder comprising a compressed gas, a solid gas generating material, or any other suitable fluid supply. Fluid supply 570 may be fluidly coupled to crank assembly 552 via a fluid supply line 572. Fluid supply line 572 may be fluidly coupled to a fluid input port of crank assembly 552. Fluid supply 570 may begin supplying fluid 576 (e.g., gas) to crank assembly 552, in response to initiation of the ejection sequence. In various embodiments, actuation of ejection handle 106 may cause fluid supply 570 to begin outputting fluid 576 to crank assembly 552. In accordance with various embodiments, crank wheel 554 is configured to rotate about in response to crank assembly 552 receiving fluid 576. Stated differently, fluid 576 from fluid supply 570 may provide rotational power to drive a rotation of crank wheel 554.

In various embodiments, crank wheel 554 may be configured to rotate (e.g., the volume of fluid supplied by fluid supply 570 may be selected to force crank wheel 554 to rotate) until left arm restraint 512 is in the fully deployed position. In various embodiments, crank assembly 552 may be configured to allow crank wheel 554 to rotate in a first circumferential direction configured to deploy drive primary arm 520 away from seat back 102, and to restrict rotation of crank wheel 554 in a second circumferential direction opposite the first circumferential direction. For example, crank assembly 552 may include a ratchet and pawl 555 configured to block or interfere with rotation of crank wheel 554 in the second circumferential direction.

In various embodiments, crank assembly 552 may include a crank shaft 560 rotationally coupled to crank wheel 554. Crank shaft 560 may be configured to translate crank shaft 560 toward primary arm 520. Translation of crank shaft 560 may drive rotation of primary arm 520 about primary arm pivot joint 524. In this regard, rotation of crank wheel 554, in response to receiving fluid 576, may cause primary arm 520 to translate to a fully deployed position. In various embodiments, the axis of rotation about which primary arm 520 rotates is not parallel to the axis of rotation about which crank wheel 554 rotates.

In various embodiments, crank shaft 560 may include a pin 562 extending toward primary arm 520. In various embodiments, pin 562 may be located through an pin orifice 582 defined by primary arm 520. In the non-deployed position, pin 562 may be located proximate a first surface 584 of pin orifice 582. In the fully-deployed position, pin 562 may be located proximate a second surface 586 of pin orifice 582. Second surface is located proximate, or closer to, primary arm pivot joint 524 as compared to first surface 584.

With reference to FIG. 8C, left arm restraint 512 and right arm restraint 514 are shown in the fully deployed position.

Arm restraint assembly 500 includes a netting 590, similar to netting 190 in FIG. 4B. In the fully-deployed position, netting 590 is drawn taut by primary arm 520. Netting 590 may restrict rearward arm or other limb movement for an occupant of the ejection seat. In various embodiments, left arm restraint 512 and right arm restraint 514 may each include a lock assembly similar to lock assembly 125 in FIG. 2A. Primary arm deployment system 550 may be coupled to ejection seat 14, with momentary reference to FIG. 1B. In this regard, primary arm deployment system 550 (e.g., crank assembly 552 and/or fluid supply 570) translates with the ejection seat during expulsion of the ejection seat from the cockpit.

Figure 9:
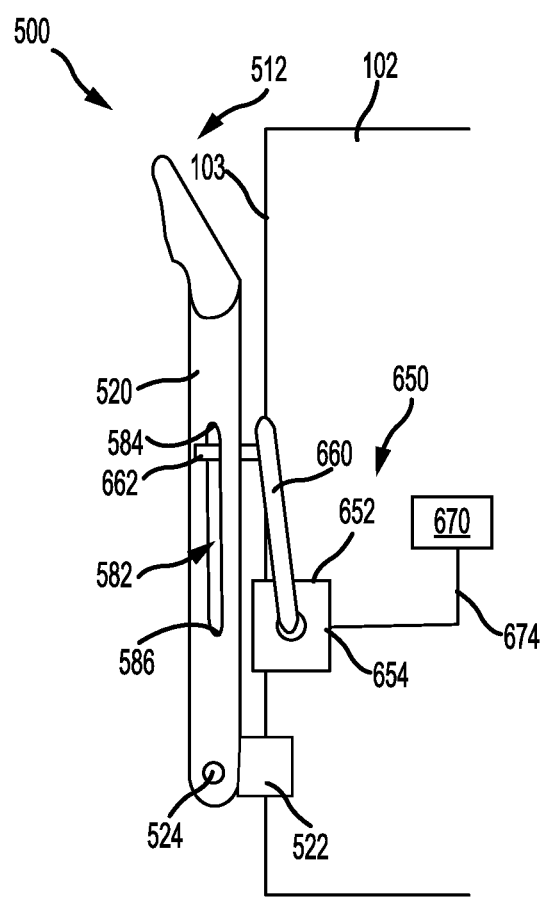
FIG. 9 illustrates an arm restraint assembly including an electromechanical actuator primary arm deployment system, with the arm restraint assembly in a non-deployed position, in accordance with various embodiments.

With reference to FIG. 9, arm restraint assembly 500 is illustrated including a primary arm deployment system 650. Primary arm deployment system 650 is an electromechanical primary arm deployment system. Arm restraint assembly 500 may include primary arm deployment system 650 in place of primary arm deployment system 550 in FIG. 8A. Primary arm deployment system 650 includes electromechanical actuator assembly 652. Electromechanical actuator assembly 652 includes an electromechanical motor 654 and a shaft 660. Electromechanical motor 654 may be configured to drive rotation of shaft 660. In various embodiments, primary arm deployment system 650 may include an electrical supply 670 electrically coupled to electromechanical motor 654. In various embodiments, electrical supply 670 may include one or more thermal batteries. An electrical signal may be provided to electromechanical motor 654 in response activation of electrical supply 670. The electrical signal may be provided to electromechanical motor 654 via wire(s) 674. Electromechanical motor 654 may rotate shaft 660 in response to receiving the electrical signal (i.e., in response to activation of electrical supply 670). In various embodiments, actuation of ejection handle 106, with momentary reference to FIG. 1B, may activate electrical supply 670. In this regard, actuation of ejection handle 106 may cause electromechanical motor 654 to rotate shaft 660, thereby translating primary arm 520 to the deployed position.

In various embodiments, shaft 660 may include a pin 662 extending toward primary arm 520. In various embodiments, pin 662 may be located through pin orifice 582. In the non-deployed position, pin 662 may be located proximate first surface 584 of pin orifice 582. In the fully-deployed position, pin 662 may be located proximate second surface 586 of pin orifice 582. Primary arm deployment system 650 may be coupled to ejection seat 14, with momentary reference to FIG. 1B. In this regard, primary arm deployment system 650 (e.g., electromechanical actuator assembly 652 and/or electrical supply 670) translates with the ejection seat during expulsion of the ejection seat from the cockpit.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An arm restraint assembly for an ejection seat, comprising:
   a primary arm; and
   a primary arm deployment system attached to the ejection seat and operationally coupled to the primary arm, the primary arm deployment system being configured to rotate the primary arm about a primary arm pivot joint, wherein the primary arm deployment system comprises:
     a cylinder configured to receive a fluid; and
     a strut piston coupled to the primary arm and configured to translate relative to the cylinder.

2. The arm restraint assembly of claim 1, wherein the strut piston is coupled to the primary arm via a pivot joint.

3. The arm restraint assembly of claim 2, wherein the primary arm deployment system further comprises a shear pin configured to block translation of the strut piston.

4. The arm restraint assembly of claim 2, wherein the pivot joint is configured to allow multidirectional movement of the primary arm relative to the strut.

5. The arm restraint assembly of claim 1, further comprising a fluid supply fluidly coupled to the cylinder.

6. An ejection seat, comprising:
   a seat back; and
   an arm restraint assembly coupled to the seat back, the arm restraint assembly comprising:

a primary arm configured to pivot relative to the seat back; and a primary arm deployment system attached to the ejection seat and operationally coupled to the primary arm, the primary arm deployment system being configured to rotate the primary arm about a primary arm pivot joint, wherein the primary arm deployment system includes:

a first biasing member configured to force the primary arm away from the seat back;

a latch configured to rotate relative to the primary arm; and a fluid supply operatively coupled to the latch, wherein the latch is configured to rotate about a latch pivot joint in response to a fluid being output from the fluid supply.

7. The ejection seat of claim 6, wherein the primary arm deployment system further comprises a second biasing member configured to rotate the primary arm about the primary arm pivot joint.

8. The ejection seat of claim 7, wherein the first biasing member comprises a compression spring and the second biasing member comprises a torsion spring.

9. The ejection seat of claim 6, wherein the primary arm deployment system further comprises:

a primary arm bracket coupling the primary arm to the seat back, wherein the primary arm is rotationally coupled to the primary arm bracket via the primary arm pivot joint; and a flange extending from the primary arm bracket, wherein the first biasing member is located between the primary arm and the flange.

10. The ejection seat of claim 6, wherein the arm restraint assembly further comprises a netting coupled to the primary arm.

11. The ejection seat of claim 10, wherein the arm restraint assembly further includes a secondary arm configured to rotate about a secondary arm pivot joint, and wherein an axis of rotation of the secondary arm is non-parallel to an axis of rotation of the primary arm.

12. An arm restraint assembly for an ejection seat, comprising:

a primary arm; and a primary arm deployment system operationally coupled to the primary arm, the primary arm deployment system being configured to rotate the primary arm about a primary arm pivot joint, wherein the primary arm deployment system includes:

a first biasing member configured to force the primary arm away from the seat back; and a second biasing member configured to rotate the primary arm about the primary arm pivot joint, wherein the first biasing member comprises a compression spring and the second biasing member comprises a torsion spring.

13. The arm restraint assembly of claim 12, wherein the primary arm deployment system further comprises:

a latch configured to rotate relative to the primary arm; and a fluid supply operatively coupled to the latch, wherein the latch is configured to rotate about a latch pivot joint in response to a fluid being output from the fluid supply.

14. The arm restraint assembly of claim 13, wherein the primary arm deployment system further comprises a fluid supply line fluidly coupled to the fluid supply and located through an orifice defined by the primary arm.

15. The arm restraint assembly of claim 12, further comprising a secondary arm configured to rotate about a secondary arm pivot joint, and wherein an axis of rotation of the secondary arm is non-parallel to an axis of rotation of the primary arm.

16. The arm restraint assembly of claim 12, wherein the primary arm deployment system further comprises:

a primary arm bracket, wherein the primary arm is rotationally coupled to the primary arm bracket via the primary arm pivot joint; and a flange extending from the primary arm bracket, wherein the first biasing member is located between the primary arm and the flange.

* * * * *